United States Patent [19]

Fuchs et al.

[11] 3,900,510

[45] Aug. 19, 1975

[54] SULFURIC ACID ESTER OF 1-AMINOBENZENE-4-(β-HYDROXYETHYL-SULFONE)-2-SULFONIC ACID, THE 4-VINYLSULFONE COMPOUND THEREOF AND A PROCESS FOR THEIR PREPARATION

[75] Inventors: Hermann Fuchs, Kelkheim, Taunus; Fritz Meininger, Frankfurt am Main, both of Germany

[73] Assignee: Hoechst Aktiengesellschaft, Frankfurt am Main, Germany

[22] Filed: Nov. 3, 1972

[21] Appl. No.: 303,626

[30] Foreign Application Priority Data
Nov. 5, 1971  Germany............................ 2154943

[52] U.S. Cl. ................. 260/458; 260/508; 260/205
[51] Int. Cl.²......................................... C07C 141/02
[58] Field of Search.................... 260/457, 508, 458

[56] References Cited
UNITED STATES PATENTS

| | | | |
|---|---|---|---|
| 1,961,196 | 6/1934 | Choate et al. ....................... | 260/508 |
| 2,106,716 | 2/1938 | Bruson............................. | 260/457 X |
| 3,202,652 | 8/1965 | Meininger et al................... | 260/200 |
| 3,385,843 | 5/1968 | Remy et al........................ | 260/163 |

OTHER PUBLICATIONS

Noller, "Chemistry of Organic Compounds," 3rd Ed., pp. 475–480, (1965).
Alexander, J. Amer. Chem. Soc., 68, 969 (1946).

*Primary Examiner*—Howard T. Mars
*Assistant Examiner*—Nicky Chan
*Attorney, Agent, or Firm*—Curtis, Morris & Safford

[57] ABSTRACT
Compounds of the formula

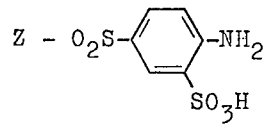

wherein Z is a grouping of the formula $HO_3SO-CH_2-CH_2-$ or $CH_2=CH-$, and their alkali metal salts, and a process for preparing them by dissolving or suspending 1-aminobenzene-4-(β-sulfatoethyl)-sulfone of the formula

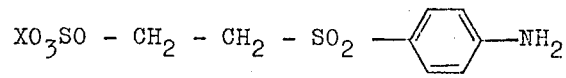

or 1-aminobenzene-4-β-hydroxyethyl-sulfone of the formula

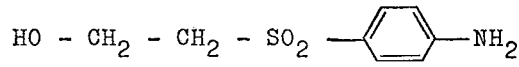

in a mixture of sulfuric acid and sulfur trioxide at a temperature of from −15° to +10°C and then continuing the reaction at a temperature of from 115° to 150°C, whereupon, if desired, the sulfuric acid ester is treated, optionally after its isolation with an alkaline agent and the vinyl compound thus obtained is isolated in the form of an alkali metal salt or an acid. The novel compounds are suitable for the preparation of valuable dyestuffs containing an amino coupling component.

3 Claims, No Drawings

SULFURIC ACID ESTER OF 1-AMINOBENZENE-4-(β-HYDROXYETHYL-SULFONE)-2-SULFONIC ACID, THE 4-VINYLSULFONE COMPOUND THEREOF AND A PROCESS FOR THEIR PREPARATION

The present invention relates to the sulfuric acid ester of 1-aminobenzene-4-(β-hydroxyethyl-sulfone)-2-sulfonic acid, the 4-vinylsulfone compound thereof and a process for their preparation.

In accordance with the invention compounds of the formula

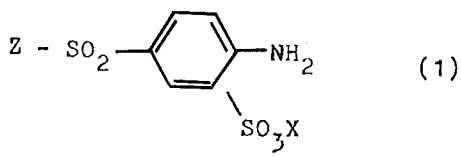

wherein Z is $XO_3SO$—$CH_2$—$CH_2$— or $CH_2$=$CH$— and X stands for hydrogen, sodium or potassium, are prepared by dissolving or suspending a compound of the formula

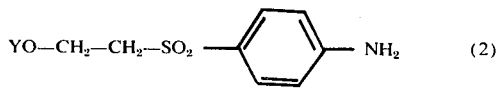

wherein Y is hydrogen or $XO_3SO$— and X is defined as above, in a mixture of sulfuric acid and sulfur trioxide at a temperature of from $-15°$ to $+10°C$ and then reacting at a temperature of from $110°$ to $150°C$, whereupon the sulfonated sulfuric acid ester compound is isolated or treated without being isolated or after its isolation with an alkaline agent at a pH-value of from 8 to 14, and the vinyl compound thus obtained is isolated in the form of an alkali metal salt or of an acid.

In accordance with one preferred embodiment of this invention, 1-aminobenzene-4-(β-sulfatoethyl-sulfone)-2-sulfonic acid and the alkali metal salts thereof corresponding to the formula

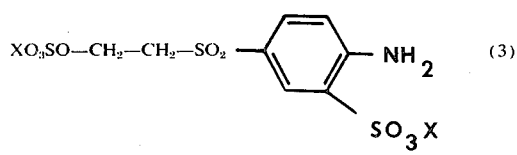

in which X stands for hydrogen, sodium or potassium are prepared by a process which comprises dissolving or suspending 1-aminobenzene-4-(β-sulfatoethyl-sulfone of the formula

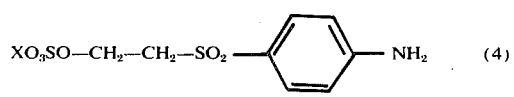

in which X is defined as above, or 1-aminobenzene-4-β-hydroxyethylsulfone of the formula

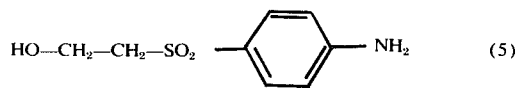

in anhydrous sulfuric acid (monohydrate) at a temperature of from $-15°$ to $+10°C$, preferably from $-5°$ to $+5°C$, and then adding a mixture of sulfuric acid and sulfur trioxide, having a mixing ratio of from 30:70 to 90:10% by weight, at the same temperature range, heating this solution or suspension within 15 to 40 minutes to a temperature of about 125°C and allowing it to stand at a temperature of from 110° to 150°C, preferably of from 125° to 135°C, for a period of from 60 minutes to 5 hours, preferably from 2 to 4 hours.

The starting products can also be introduced, at the low temperature range indicated, directly into the mixtures of sulfuric acid and sulfur trioxide, having a content of up to 30% by weight of $SO_3$, and then heated therein, as indicated, at 110°–150°C and allowed to stand.

The dissolving or suspending operation at the low temperature range indicated is an absolutely necessary process step for obtaining good yields. If these operations are carried out at room temperature or even without cooling, the yield of 1-aminobenzene-4-(β-sulfatoethyl-sulfone)-2-sulfonic acid considerably reduced. In some instances, only traces of the desired reaction product are obtained.

If the heating step is carried out at temperatures exceeding 150°C, sulfonation of 1-aminobenzene-4-β-hydroxyethylsulfone or 1-aminobenzene-4-β-sulfatoethyl-sulfone by means of mixtures of sulfuric acid and sulfur trioxide results in mixtures of various sulfonation products, the structures of which have not yet been determined. 1-Aminobenzene-4-(β-sulfatoethylsulfone)-2-sulfonic acid is obtained only in minor amounts or in traces.

For the work-up the sulfonation mixture is diluted with ice and the excess acid is neutralized by means of an alkali metal hydroxide or carbonate and/or calcium carbonate. After the alkali metal sulfate and/or calcium sulfate precipitate has been separated by filtration, the alkali metal salt of 1-aminobenzene-4-(β-sulfatoethyl-sulfone)-2-sulfonic acid is separated by adding sodium chloride.

The alkali metal salt may also be isolated by spray-drying.

The yields amount to 70–80% of the theoretical yield, calculated on the free acid.

This invention also provides a process for the preparation of 1-aminobenzene-4-vinylsulfone-2-sulfonic acid and the alkali metal salts thereof corresponding to the formula

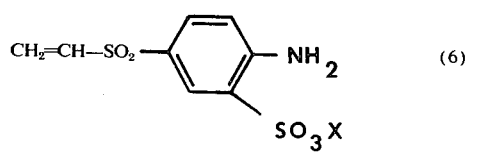

in which X stands for hydrogen, sodium or potassium, by treating the sulfato compound of the formula (3) in an aqueous solution with a strongly alkaline agent and precipitating the acid as an inner salt by adding a mineral acid. For preparing the alkali metal salt of the vinyl compound of the formula (6), the alkali metal salt of the sulfuric acid ester of the formula (3) is dissolved in water and the pH of the solution is adjusted to a value of from 8 to 14, preferably from 11 to 13, by means of a strong inorganic base, preferably sodium hydroxide solution, and the solution is heated for 2 to 10 minutes at 30°–50°C until the pH-value remains constant. The alkali metal salt may be obtained by neutralizing the solution by means of hydrochloric acid and by salting out with sodium or potassium chloride or by spray-drying the neutralized solution.

1-Aminobenzene-4-($\beta$-sulfatoethyl-sulfone)-2-sulfonic acid and 1-aminobenzene-4-vinylsulfone-2-sulfonic acid as well as the alkali metal salts thereof are novel aminobenzene compounds, which can be used as valuable diazo components for the synthesis of dyestuffs. For example, using 2-aminonaphthalene derivatives, aminopyrazoles or tertiary amines of the benzene series as coupling components, red, orange, brown orange and yellow dyestuffs are obtained, which have a high tinctorial strength, a good solubility in water and a good fastness to light and which dye cotton and preferably wool and polyamide fibers shades fast to wet processing.

The following Examples serve to illustrate the invention, the parts and percentages being by weight unless stated otherwise. The relationship between "parts by weight" and "parts by volume" is as grams to cubic centimeters, respectively.

EXAMPLE 1

68.0 Parts of 1-aminobenzene-4-$\beta$-sulfatoethyl sulfone were introduced portionwise while cooling and stirring, under exclusion of atmospheric moisture, in 138 parts of 100% strength sulfuric acid (monohydrate) so that the temperature did not exceed +5°C. After stirring for 30 minutes, 35 parts of oleum having a $SO_3$-content of 65% were slowly added dropwise while the temperature was maintained at no more than +5°C by external cooling. Subsequently, the mixture was heated to 130°C within 25 to 30 minutes and stirred for 3.5 hours at this temperature. The reaction mixture was then introduced while stirring into 400 parts of ice and the aqueous solution was neutralized at 20°C by means of 145 parts of anhydrous calcium carbonate, then by means of 40 parts of calcined sodium carbonate to reach a pH-value of from 6 to 6.5. Calcium sulfate which had separated was suction-filtered and the filter cake was washed three times each with 75 parts by volume of water. 1-Aminobenzene-4-$\beta$-sulfatoethyl-sulfone-2-sulfonic acid was precipitated from the filtrate in the form of a disodium salt by saturating the filtrate with sodium chloride. It was obtained in a yield of 75% of the theoretical yield, calculated on 1-aminobenzene-4-$\beta$-sulfatoethyl-sulfone used.

EXAMPLE 2

68.0 Parts of 1-aminobenzene-4-$\beta$-sulfatoethyl-sulfone were introduced portionwise, while cooling and stirring and under the exclusion of atmospheric moisture, into 101 parts of oleum having a $SO_3$-content of 20%, so that the temperature did not exceed +5°C. After stirring for 30 minutes, the mixture was heated to 130°C within 20 to 30 minutes and stirred for 3.5 hours at this temperature. The reaction mixture was introduced while stirring into 400 parts of ice and the aqueous solution was neutralized by means of 80 parts of anhydrous calcium carbonate. After neutralization at 20°C by means of 30 parts of calcined sodium carbonate to a pH of 6.5 the mixture was filtered and the filtrate was saturated with sodium chloride. 1-Aminobenzene-4-($\beta$-sulfatoethylsulfone)-2-sulfonic acid was obtained in the form of a disodium salt with a yield of 70% of the theoretical yield. 0.1 Mol of this sulfation product was dissolved in 150 ml of water and concentrated sodium hydroxide solution was added at 30°C until a pH-value of 12.0 remained constant for at least 3 minutes. Subsequently, concentrated hydrochloric acid was added until a pH of 1.0 was reached, whereupon 1-aminobenzene-4-vinylsulfone-2-sulfonic acid precipitated in the form of an inner salt. It was washed with 2N hydrochloric acid until free from salt and dried.

Yield: 24.2 g = 92% of the theoretical yield.
Calculated: C, 36.5%; H, 3.4%; N, 5.3%; S, 24.3%.
Found: C, 36.5%; H, 3.5%; N, 5.4%; S, 23.8%;
C, 36.8%; H, 3.7%; N, 5.3%; S, 23.9%.

EXAMPLE 3

50.0 Parts of 1-aminobenzene-4-$\beta$-hydroxyethyl-sulfone were introduced portionwise, while stirring and with the exclusion of atmospheric moisture, into 103 parts of 100% sulfuric acid (monohydrate), so that the temperature did not exceed +5°C. After having been stirred for 30 minutes, 66 parts of oleum having a $SO_3$-content of 65% were slowly added dropwise, the temperature being allowed to rise to at most +5°C. The mixture was then heated to 130°C within 30 minutes and stirred for 3.5 hours at this temperature. The reaction mixture was introduced while stirring into 400 parts of ice, and the aqueous solution was worked up as in Example 1. 1-Aminobenzene-4-$\beta$-sulfatoethylsulfone-2-sulfonic acid was obtained in the form of a disodium salt with a yield of 75% of the theoretical yield, calculated on 1-aminobenzene-4-$\beta$-hydroxyethyl-sulfone used.

EXAMPLE 4

136 Parts of 1-aminobenzene-4-$\beta$-sulfatoethyl-sulfone were introduced portionwise, while cooling and stirring and under exclusion of atmospheric moisture, into 276 parts of 100% sulfuric acid (monohydrate), so that the temperature did not exceed +10°C. After having been stirred for 30 minutes, 70 parts of oleum having a $SO_3$-content of 65% were slowly added dropwise, the temperature being also maintained at no more than +10°C by external cooling. The mixture was then heated to 145°C within 25–30 minutes and stirred for 3.5 hours at this temperature. The reaction mixture was then introduced while stirring into 800 parts of ice and the aqueous solution was neutralized at 20°C by means of 290 parts of anhydrous calcium carbonate and then by means of 80 parts of calcined sodium carbonate to reach a pH-value of from 6.0 to 6.5. The calcium sulfate precipitate was suction-filtered and the filter cake was washed three times each with 150 parts by volume of water. 1-Aminobenzene-4-$\beta$-sulfatoethyl-sulfone-2-sulfonic acid was precipitated as the disodium salt from the filtrate by saturation with sodium chloride and it was obtained in a yield of 70% of the theoretical yield, calculated on 1-aminobenzene-4-$\beta$-sulfatoethyl-sulfone used.

EXAMPLE 5

68.0 Parts of 1-aminobenzene-4-β-sulfatoethylsulfone were introduced portionwise while cooling and stirring and with the exclusion of atmospheric moisture, into 101 parts of oleum having a $SO_3$-content of 20%, so that the temperature did not exceed $-10°C$. After having been stirred for 30 minutes, the mixture was heated to 120°C within 20 to 30 minutes and stirred for 4.5 hours at this temperature. The reaction mixture was introduced while stirring into 400 parts of ice and the aqueous solution was neutralized by means of 80 parts of anhydrous calcium carbonate. After neutralization at 20°C by an addition of 30 parts of calcined sodium carbonate to a pH-value of 6.5, the mixture was filtered and the filtrate was saturated with sodium chloride. 1-Aminobenzene-4-(β-sulfatoethylsulfone)-2-sulfonic acid was obtained as a disodium salt with a yield of 75% of the theoretical yield.

EXAMPLE 6

0.1 Mol of 1-aminobenzene-4-(β-sulfatoethylsulfone)-2-sulfonic acid was dissolved in 150ml of water, 50 g of ice and 25 g of 37% hydrochloric acid were added and the mixture was diazotized, while stirring, by introducing 20 ml of 5N sodium nitrite solution beneath the surface of the liquid. After 15 minutes, a small amount of amidosulfonic acid was added to destroy excess nitrous acid and then the clear diazonium salt solution was combined with a solution of 0.1 mol of N-ethyl-N-β-cyanoethyl-m-toluidine in 100 ml of water and 10 g of 37% hydrochloric acid. The pH-value of the coupling mixture was adjusted to 1.5–1.8 by adding dropwise a 20% sodium acetate solution. The coupling reaction was complete after 12 hours. The precipitated dyestuff was dissolved by neutralizing it (pH = 6.5) with calcined sodium carbonate, the solution was clarified and the dyestuff was precipitated by adding 20% of sodium chloride, calculated on the solution volume, and 10 G of 37% hydrochloric acid at pH of 2.5. After drying, a light brown dyestuff powder was obtained, which — when applied to wool from a boiling bath weakly acidified with acetic acid — yielded an orange dyeing very fast to wet processing and fast to light. The dyestuff corresponds, in the form of the free acid, to the formula

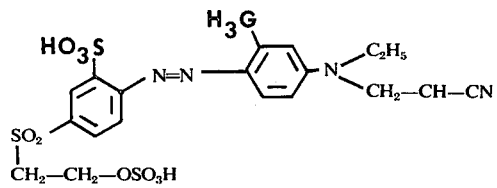

Further examples illustrating the utility of the compounds of this invention in the preparation of diazo components and azo dyes are set forth in application Ser. No. 303,625, filed Nov. 3, 1972.

We claim:

1. A compound of the formula

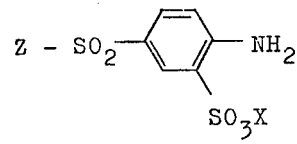

in which Z is $XO_3SO—CH_2CH_2—$ or $CH_2=CH—$ and X is hydrogen, sodium or potassium.

2. A compound as defined in claim 1 wherein Z is $CH_2=CH—$.

3. A compound of the formula

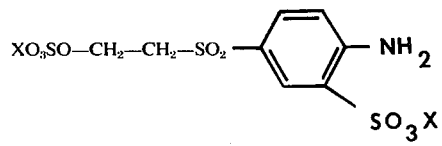

where X is hydrogen, sodium or potassium.

* * * * *